United States Patent

[11] 3,571,915

[72] Inventor Fred A. Shirland
Lakewood, Ohio

[21] Appl. No. 616,885
[22] Filed Feb. 17, 1967
[45] Patented Mar. 23, 1971
[73] Assignee Clevite Corporation

[54] METHOD OF MAKING AN INTEGRATED SOLAR CELL ARRAY
6 Claims, 7 Drawing Figs.

[52] U.S. Cl. .......... 29/572, 136/89, 29/620, 29/472.7
[51] Int. Cl. .......... H01v 49/00
[50] Field of Search .......... 136/89; 29/572, 620, 472.7

[56] References Cited
UNITED STATES PATENTS

| | | | |
|---|---|---|---|
| 3,020,412 | 2/1962 | Byczkowski | 29/572 |
| 3,140,379 | 7/1964 | Schleich et al. | 29/620 |
| 3,151,379 | 10/1964 | Escoffery | 29/572 |
| 3,200,490 | 8/1965 | Clymer | 29/472.7 |
| 3,401,448 | 9/1968 | Iles et al. | 29/572 |

*Primary Examiner*—Paul M. Cohen
*Attorney*—Frederic B. Schramm

ABSTRACT: An integral battery of serially connected photovoltaic cells on a single insulating substrate. Metallized areas are formed on the substrate with semiconductive film such as cadmium sulfide vacuum evaporated upon each of the metallized areas. Barrier layers are formed on the cadmium sulfide films to produce PN junctions. Electrode leads extend from each metallized area under the semiconductor film to a top surface of the barrier layer of an adjacent semiconductor film.

INVENTOR.
FRED A. SHIRLAND
BY Frederic B. Schramm
ATTORNEY

INVENTOR.
FRED A. SHIRLAND
BY Frederic B. Schramm
ATTORNEY

METHOD OF MAKING AN INTEGRATED SOLAR CELL ARRAY

An object of the invention is to provide a highly compact rugged battery module for producing relatively high power or voltage from radiant energy. The module may take various forms. Illustrations of these are two forms, a high voltage form and a standard 28-volt power form. The high voltage form consists of a large number of relatively small laminated cells on one insulating substrate. Diagonal electrode tabs are provided for forming connections between successive cells by slanting electrodes of one polarity in one direction and electrodes of the opposite polarity in the opposite direction. The semiconductor areas are evaporated on to the electrode pattern of the electrodes of one polarity. The power form of the integral battery consists of a module of about 70 to 80 cells on a single substrate covered by a single plastic film, each cell being of greater area than for high voltage and having a top electrode in grid form to admit light to the cell. A protruding flap from each upper electrode conductor grid is connected electrically to a metallized protruding surface of an adjacent cell.

Other and further objects, features and advantages of the invention will become apparent as the description proceeds.

A better understanding of the invention will be afforded by the following detailed description considered in conjunction with the accompanying drawing in which.

Like reference characters are utilized throughout the drawing to designate like parts.

Figure 1:
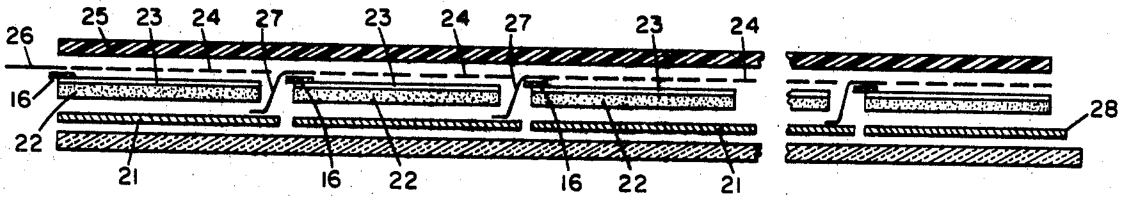
FIG. 1 is a schematic diagram of an embodiment of the invention.

One of the major interests in the conversion of radiant energy into electrical current and power is the use of sunlight for powering electrical devices. Consequently, apparatus constructed in accordance with the invention is utilized primarily as solar batteries. However, the invention is not limited thereto and does not exclude the use of photovoltaic batteries or modules made in accordance with the invention for response to other forms of light and radiant energy than direct sunlight. When the term solar battery is employed therefore, it is intended to include batteries and modules including photovoltaic cells.

Solar cells are low voltage sources. A single solar cell usually generates only a fraction of a volt. In order to obtain high voltages, many such individual solar cells must be connected in series. If hundreds to thousands of volts are desired, the interconnection of the many hundreds to many thousands of individual cells is a tedious and expensive operation, and one broken or poorly attached lead will cause the entire battery to be inoperative. It has been proposed to obtain a higher voltage photovoltaic effect by the additive effect of P-N junctions at grain boundaries of obliquely evaporated CdTe films to obtain high voltages from solar cells. One of the objects of the invention is to avoid the problems of high variability, lack of reproducibility and inability to transmit useful amounts of power to external devices involved in such CdTe films.

In accordance with the invention, vacuum evaporated cadmium sulfide, thin film solar cells are employed to form a high voltage solar battery quickly and economically that can transfer useful amounts of power to an external useful device with a high degree of reliability.

A plurality of small areas of cadmium sulfide, CdS, or other suitable semiconductive material is vacuum evaporated through suitably shaped evaporation mask onto a substrate on which an appropriate pattern of negative electrometallic leads has been vacuum evaporated, or otherwise formed, so that each area of CdS will partially cover one lead. A barrier is formed on the upper surface of each CdS area by applying a cuprous sulfide ($Cu_2S$) slurry, or by other means known in the art. However, the slurry barrier is kept separated from the negative electrode leads. The slurry is heated to form barriers.

Then the cells so formed are connected by superimposing a thin flexible insulating layer in a suitably laid down pattern (by vacuum evaporation or other means) of positive electrode leads so arranged geometrically so that each lead on the upper insulating barrier bridges from the barrier of one cell to the negative electrode lead which projects from the side (or edge) of the previous cell. Prior to the attachment of the upper insulating layer, however, an insulating stripe is applied over the edges of the cells to keep the positive electrodes from shorting across the edge of cadmium sulfide where the barrier does not extend. Either the substrate or the upper insulating layer may be translucent, but one of them must be, so that either a front wall or backwall cell is possible.

The number of cadmium sulfide, or other suitable semiconductor, areas is chosen to yield the total voltage desired, for the area of each cadmium sulfide area is made only as large as needed to yield the desired output current.

FIGS. 2 to 5 of the drawings illustrate in the order of the major steps the buildup of a typical portion of a high voltage solar battery module viewed from above in accordance with one embodiment of the invention.

A high-temperature withstanding plastic insulator 11 in sheet form is utilized as a substrate. If the light is to be admitted to the cells from below, the substrate is preferably transparent or at least translucent. A suitable substrate consists of a polyimide sold by the duPont de Nemours Company under the trade name Kapton. Negative electrode leads 12 are formed upon this substrate for depositing the active material. For example, a mask may be placed upon a substrate having openings with the configuration of leads 12 illustrated in FIG. 2 and negative electrode metallic leads are thus deposited upon the substrate. Although a practical economic method of forming these leads is by vacuum evaporation through a mask, the invention is not limited to this method of formation.

Figure 3:
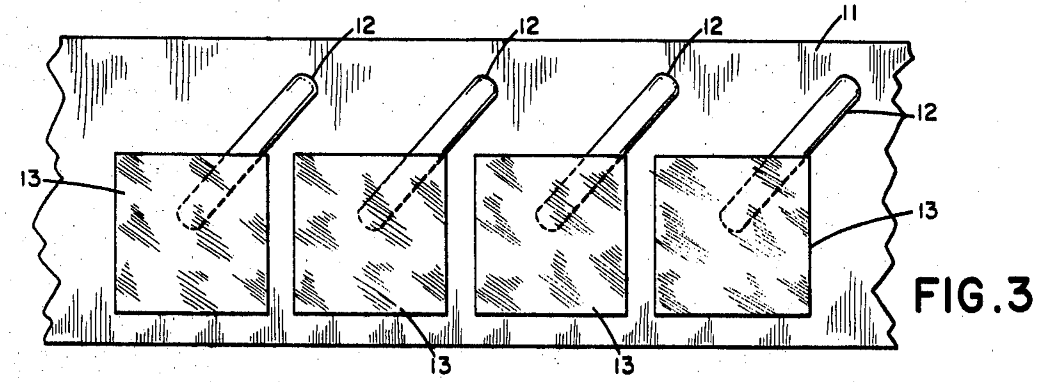
FIG. 3 is a diagram of the next step in the formation of the high voltage solar battery showing cadmium sulfide areas evaporated onto the negative electrode pattern.
Figure 4:
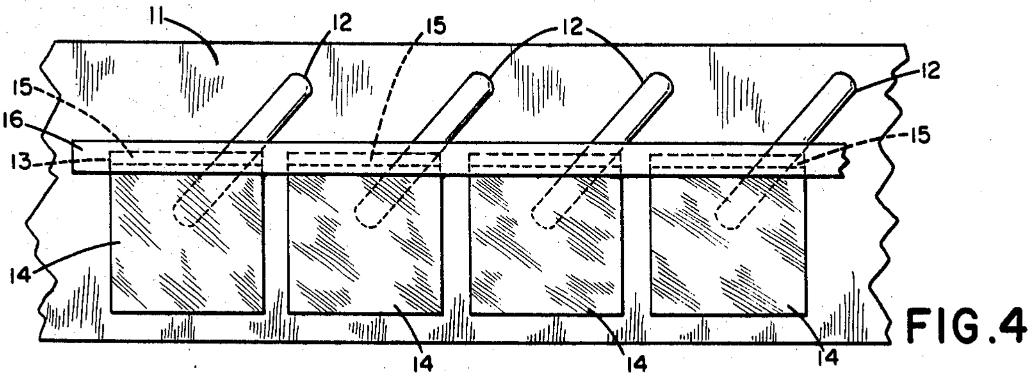
FIG. 4 is a diagram illustrating the succeeding step in the formation of the high voltage solar battery and showing the formation of a barrier layer on the top surface of the cadmium sulfide areas with an insulating stripe to protect crossovers.
Figure 5:
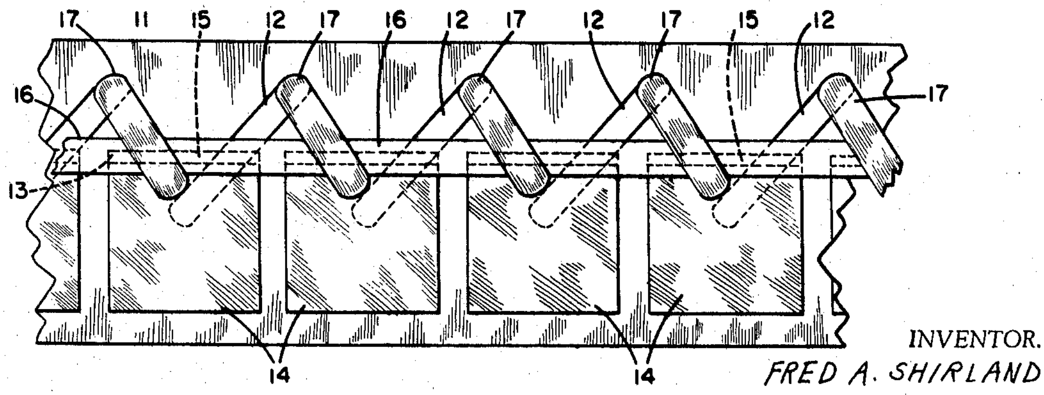
FIG. 5 is a diagram illustrating still another step in the formation of a high voltage solar battery and showing the formation of the positive electrode pattern on the under side of an upper insulating layer applied on top of the assembly (with the insulating stripe omitted).

After the negative electrode leads 12 have been formed upon or adhered to the plastic substrate, cadmium sulfide areas 13 are evaporated onto the substrate, each overlying a portion of one of the negative electrode leads as illustrated in FIG. 3. After the areas 13 of cadmium sulfide or other suitable semiconductor material have been deposited on the substrate, barrier layers 14 are formed on the cadmium sulfide layers 13, taking care to leave strips 15 uncovered along the edges of the semiconductor layers. The barrier layer 14 may be formed by applying the slurry of $Cu_2S$ to the upper surface of each cadmium sulfide area, or by other means known in the art. The uncovered strips 15 serve to assure separation of the positive barrier from the negative electrode leads.

When a copper sulfide slurry has been utilized, it is then heat-treated to form the barrier layer.

An insulating stripe 16 is placed along the edges of the areas 13 from which the negative leads 12 protrude in order to protect lead crossovers from short-circuiting the barrier layer and the semiconductor material. The strip 16 may be composed of any suitable insulating plastic such as that sold under the trade name of Mylar, for example, or it could be applied as a varnish, or as a plastic film deposited from solution, or as an evaporated layer, for example SiO or $SiO_2$.

Thereafter positive electrode leads 17 are formed in a similar manner is which the negative electrode leads 12 have been formed. For protection of the barrier layers and to provide a unitary structure, an upper insulating layer (not shown) is then placed over the entire structure. Either the substrate or the upper insulating layer may be transparent or translucent so that either a front wall or a backwall cell is provided.

For increased reliability, the connected leads 12 and 17 may also be brought out redundantly from the lower edges of the cadmium sulfide areas as well as the upper edges so that two complete sets of series connections would exist. In practice the cadmium sulfide areas may be as small as 0.1 × 0.5 centimeters each, so that many thousands could be made in an area of several square feet. In this manner a thousand-volt battery may be formed in an area of 1 × 3 feet yielding about one milliampere in sunlight.

Where an assembly of greater conductivity and current delivering capacity is desired, the cadmium sulfide layers may be provided with metallic electrodes covering their entire surfaces. As illustrated in FIG. 1, the insulating substrate 11 may have metallized layers 21 formed thereon upon which the cadmium sulfide layers 22 are formed, having barrier layers 23 formed on their upper surfaces.

In order to admit light to the upper surfaces of the cells, upper or positive electrodes 24 are provided in the form of metallic grids and the entire assembly is overlaid with a transparent or translucent plastic cover 25.

A tab 26 is brought from the cell at the left hand end of the array or module to serve as positive lead of the module. Each of the metallized layers 21 extends sufficiently far to the right beyond the cadmium sulfide layer 22 so that positive electrode grid tabs 27 of the other cells may be bent downward to make contact with the metallized layers 21 and to connect all the cells in series. An exposed tab 28 of the right hand metallized layer 21 then serves as the negative lead of the module or array. The construction thus minimizes the number of external cell connections that would have to be made to construct large area solar cell power panels. Moreover, this reduces the cost of constructing such panels and enhances the reliability of solar power panels due to the greater physical integrity of such a construction.

In FIG. 1 the various layers have been separated from each other for clarity in the drawing. It will be understood, however, that the successive layers are actually in contact with each other as illustrated in FIG. 6 which shows a slight modification in which unitary cells are mounted between a plastic substrate 11 and a plastic cover 25 with an extending tab 29 of the negative electrode 21 electrically connected to an extending tab 31 of the positive electrode grid 24, to form the serial connection of cells in a module.

Figure 6:
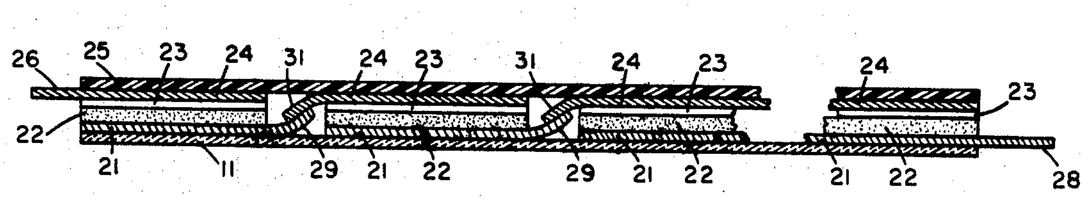
FIG. 6 is a fragmentary diagram of a lower-voltage, higher-power voltaic battery module forming another embodiment of the invention.
Figure 7:
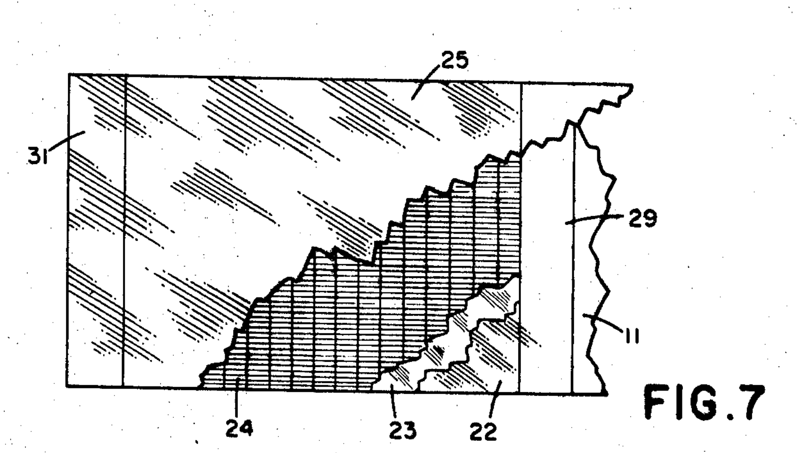
FIG. 7 is a fragmentary diagram with portions broken away showing one of the cells in the module of FIG. 6.
Figure 2:
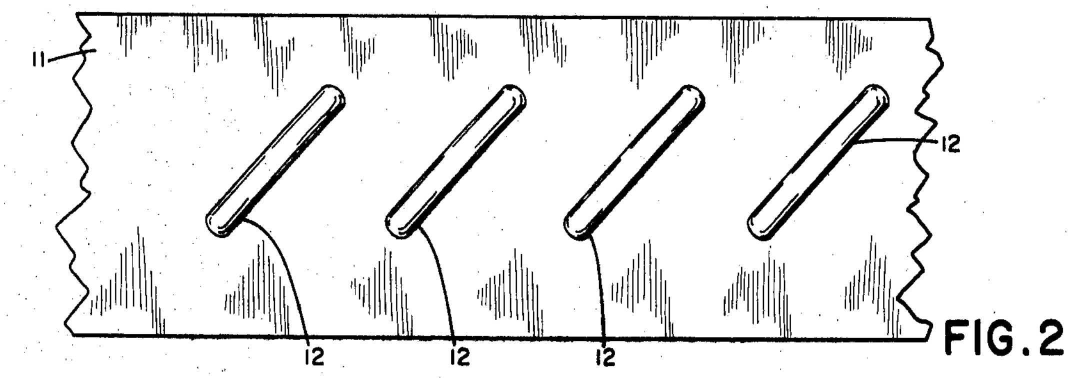
FIG. 2 is a diagram illustrating the first step in the production of a high voltage solar battery constituting an embodiment of the invention and showing a negative collector electrode pattern on an insulating substrate.

FIG. 7 represents to an enlarged scale one of the cell portions of the module of FIG. 6 with the plastic cover 25 broken away to expose the grid structure 24 which is in turn broken away to expose the cadmium sulfide layer 22.

The invention is not limited to the use of particular composition for the leads and electrodes. However, in the embodiment of FIG. 1, successful results have been obtained by utilizing positive leads composed of 0.5 mil thick gold-plated copper foil integral with the positive electrode grid and negative leads composed of 0.3 mil metallized layer on a 1 mil Kapton plastic integral with the substrate and gold-plated for convenience in soldering.

In the embodiment of FIGS. 2 to 5 inclusive, a Kapton substrate has been successfully employed with a silver coating plated with zinc. The zinc plating may be accomplished by electroplated, spraying, vacuum evaporation or pyrolytic technique. Upon a zinc-plated substrate the cadmium sulfide film is deposited, upon which in turn the barrier layer is formed. The positive electrode is in the form of a gold-plated copper grid. The plastic cover may be composed of either Kapton film or Mylar film, the latter having some advantage with respect to a greater degree of transparency.

As described more fully in U.S. Pat. No. 2,820,841 to Carlson, Shiozawa and Finegan, the barrier layer forms a P-N junction with the semiconductor layer and the mechanism of photovoltaic generation is believed to involve the formation of electron-hole pairs in the cadmium sulfide layer in response to the action of incident photons of photo effective radiation. In consequence, minority charged carriers diffuse or drift across the junction creating a potential difference thereacross which in turn causes an electric current to flow in an external circuit when the module is exposed to sunlight or other source of radiation.

Although at the present time the use of cadmium sulfide as the semiconductor layer is considered most practical, the invention is not limited thereto and does not exclude the use of such semiconductor layers as cadmium telluride, gallium arsenide, gallium phosphide and cadmium selenide.

The metallized areas may be metallized with any suitable metal which is compatible with the semiconductor employed. For example, silver, copper, molybedum or zinc may be employed. If a silver coating is employed, it is preferably in turn coated with zinc to make the surface compatible with cadmium sulfide.

The barrier layer may be formed by any suitable process such as chemical dip in cuprous ions such as cuprous chloride ($CuCl$), for example, to form a cuprous sulfide surface layer.

In addition to a copper electrode at the top or the bottom of the semiconductor layer, other materials such as stannous oxide may be employed.

The action which results from heating the cuprous sulfide slurry to form the barrier is the promotion of a reaction with the cadmium sulfide. However, the barrier also may be formed by the evaporation technique. An example of this procedure is described in my U.S. Pat. No. 3,146,138.

A particularly advantageous feature of my present invention, especially for mass production, is that every step of the process may be carried out by the evaporation technique. All components of the battery, except the substrate, may be deposited from the vacuum phase. This has considerable economic advantage in permitting the whole battery to be formed on a single substrate by successive operations in the same vacuum chamber. Externally controlled masks and evaporating sources are actuated successively to produce the battery. Even the final protective layer 25 may be applied by evaporation if a suitable substance such as silica or silicon dioxide is employed.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended therefore, to cover all such modifications and variations as fall within the scope of the invention.

I claim:

1. The method of producing a high voltage photoresponsive battery which comprises:

the steps of forming a plurality of conductive electrode leads at spaced locations on a surface of a substrate;

depositing a plurality of small areas of semiconductor material upon the substrate, each area overlapping one of said electrode leads;

forming a barrier on the upper surface of each semiconductor area; and forming electrode leads of opposite polarity, each extending from one area to the electrode lead on which the semiconductor material of the adjacent area has been deposited.

2. The method described in claim 1 wherein:

conductive leads are evaporated onto the substrate;

semiconductor material is evaporated onto the substrate overlapping electrode leads;

a barrier is evaporated on the upper surface of each semiconductor area; and electrode leads of polarity opposite to the first mentioned conductive leads are evaporated at portions of the substrate each extending from one semiconductor area to an electrode of an adjacent area.

3. The method described in claim 2 wherein a cover is evaporated onto the assembly formed by the steps of claim 2.

4. The method described in claim 3 wherein a substance from the group including SiO and $SiO_2$ is evaporated to form the cover.

5. The method claimed in claim 1 wherein the semiconductor material is cadmium sulfide.

6. The method claimed in claim 5 wherein the barrier is formed by applying a cuprous sulfide slurry to the upper surface of each cadmium sulfide area and heating the cuprous sulfide slurry.